US012596787B1

(12) United States Patent
Huang et al.

(10) Patent No.: US 12,596,787 B1
(45) Date of Patent: Apr. 7, 2026

(54) PREDICTION OF EXECUTION BEHAVIORS IN SANDBOX

(71) Applicants: Qiang Huang, Nanjing (CN); Hu Cao, Nanjing (CN); Weichao Dai, Nanjing (CN)

(72) Inventors: Qiang Huang, Nanjing (CN); Hu Cao, Nanjing (CN); Weichao Dai, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 318 days.

(21) Appl. No.: 17/978,063

(22) Filed: Oct. 31, 2022

Related U.S. Application Data

(62) Division of application No. 16/502,788, filed on Jul. 3, 2019, now abandoned.

(51) Int. Cl.
G06F 21/53 (2013.01)
G06F 21/56 (2013.01)

(52) U.S. Cl.
CPC ............ G06F 21/53 (2013.01); G06F 21/566 (2013.01)

(58) Field of Classification Search
CPC .............................................. G06F 21/50–568
See application file for complete search history.

(56) References Cited

U.S. PATENT DOCUMENTS

| | | | |
|---|---|---|---|
| 11,108,787 B1 | 8/2021 | Shen et al. | |
| 2011/0138471 A1 * | 6/2011 | Van De Weyer ... | H04L 63/1433 726/25 |

| | | | |
|---|---|---|---|
| 2013/0291111 A1 | 10/2013 | Zhou et al. | |
| 2014/0090061 A1 | 3/2014 | Avasarala et al. | |

(Continued)

FOREIGN PATENT DOCUMENTS

| | | | | |
|---|---|---|---|---|
| CN | 108334781 A | * | 7/2018 | ........... G06F 21/562 |
| CN | 109492395 | | 3/2019 | |

OTHER PUBLICATIONS

Xiao, X., Zhang, S., Mercaldo, F. et al. Android malware detection based on system call sequences and LSTM. Multimed Tools Appl 78, 3979-3999 (2019). https://doi.org/10.1007/s11042-017-5104-0 (Year: 2017).*

(Continued)

*Primary Examiner* — Madhuri R Herzog
(74) *Attorney, Agent, or Firm* — Beyer Law Group LLP

(57) ABSTRACT

A sandbox module on a host computer executes sample programs and includes a dynamic analysis module that collects run-time behaviors of the sample program. A static analysis module collects static behaviors of the sample programs. The behaviors are sent to a recurrent neural network to train one or more models. Each model is trained on a type of sample file. During prediction, the sequence network inputs the behaviors from an unknown sample program. An encoder encodes the behaviors into numerical tuples. A recurrent neural network model inputs the tuples and outputs a predicted behavior of the sample program based upon the tuples. A decoder decodes a numerical tuple representing the predicted behavior and outputs the predicted behavior into a decision engine. The decision engine of the sandbox outputs a decision regarding whether the sample program is malicious or not. Look up tables permit mapping between tuples and the textual behaviors.

20 Claims, 7 Drawing Sheets

(56) References Cited

U.S. PATENT DOCUMENTS

| | | |
|---|---|---|
| 2015/0106931 A1 | 4/2015 | Mankin et al. |
| 2016/0277423 A1 | 9/2016 | Apostolescu et al. |
| 2016/0381057 A1 | 12/2016 | Das et al. |
| 2017/0251003 A1* | 8/2017 | Rostami-Hesarsorkh .................. G06N 5/01 |
| 2017/0262633 A1 | 9/2017 | Miserendino et al. |
| 2019/0213099 A1* | 7/2019 | Schmidt .................. G06N 3/08 |
| 2019/0384911 A1 | 12/2019 | Caspi et al. |

OTHER PUBLICATIONS

Lindorfer, Martina, Matthias Neugschwandtner, and Christian Platzer. "Marvin: Efficient and comprehensive mobile app classification through static and dynamic analysis." 2015 IEEE 39th annual computer software and applications conference. vol. 2. IEEE, 2015. (Year: 2015).*

Huang et al., U.S. Appl. No. 16/502,788, filed Jul. 3, 2019.

* cited by examiner

Program Behavior Prediction System

104

SEQUENCE NETWORK

ENCODER
220

CLASSIFIER
230

LSTM
NETWORK 1
240

LSTM
NETWORK 2
242

LSTM
NETWORK 3
244

•••   •••

LSTM
NETWORK N
248

DECODER
260

200

Sequence Network Architecture

PREDICTION PHASE

SUBMIT PROGRAM SAMPLE TO SANDBOX    404

PERFORM STATIC ANALYSIS    408

PERFORM DYNAMIC ANALYSIS    412

EXTRACT FEATURES FROM ANALYSIS    416

418

FEED BEHAVIOR FEATURES INTO SEQUENCE NETWORK    420

SEQUENCE NETWORK PREDICTS FUTURE BEHAVIORS    424

FEED PREDICTED BEHAVIORS BACK INTO SANDBOX    428

DECISION ENGINE MAKES DECISION    432

SANDBOX OUTPUTS DECISION    436

END

PREDICTION OF EXECUTION BEHAVIORS IN SANDBOX

This application is a divisional of U.S. patent application Ser. No. 16/502,788 filed Jul. 3, 2019, entitled "PREDICTION OF EXECUTION BEHAVIORS IN SANDBOX," which is hereby incorporated by reference.

FIELD OF THE INVENTION

The present invention relates generally to detecting malicious software in a computer. More specifically, the present invention relates to using a recurrent neural network to predict behaviors of software.

BACKGROUND OF THE INVENTION

A sandbox is a form of software virtualization that provides a restricted environment on a computer that lets programs and processes run in their own isolated virtual environment—as if each were running in its own operating system. Typically, programs running within the sandbox have limited access to a computer's files and systems, and they can make no permanent changes. A sandbox may also provide a tightly-controlled set of resources for guest programs to run in, such as scratch space on disk and memory. Usually, network access, the ability to inspect the host system, reading from input devices or modifying the hard disk, are disallowed or heavily restricted.

A sandbox is typically used to evaluate a suspected malware sample program, in order to prevent it from harming a computer system. A sandbox performs a dynamic analysis on the submitted malware sample. During that analysis, the run-time behaviors of the sample are collected and a decision as to whether the sample is malicious or not is based upon those behaviors. Thus, the ability to collect a variety of significant run-time behaviors is important in the creation and use of a sandbox program.

It is not easy, however, to collect the behaviors needed in an executing sandbox, even if advanced hooking mechanisms are used. Since each analysis of a malware sample follows only a single execution path, the behaviors collected in that analysis only cover a relatively small portion of the overall executing code of the sample. In addition, sandbox analyses are configured to be performed in a certain time period. Once that time is up, the analysis is typically terminated, no matter whether the sample has finished executing or not. Because the analysis is subject to this limited time, there may not be enough collected behaviors to make an informed decision. Moreover, if the sample is in fact malicious, the malware may use various anti-monitoring tricks, such as evasion, anti-hooking, multi-component, and so on. All of these tricks also make it difficult to collect a sufficient set of sample behaviors to make a decision.

Accordingly, a technique to better collect the behaviors of a sample in a sandbox is desired.

SUMMARY OF THE INVENTION

To achieve the foregoing, and in accordance with the purpose of the present invention, we propose a method which combines deep learning, such as a recurrent neural network (RNN) with a trained model, to predict the future behaviors of samples analyzed in a sandbox. This method improves the behavior-collecting ability in a sandbox and overcomes the restrictions of the prior art techniques mentioned above.

Such behavior prediction improves the core ability of behavior collecting for any number of anti-virus products, such as the SANDCASTLE module available from TREND MICRO, INC.

In a first embodiment, a method trains a model to predict behaviors of a sample program. The sample program executes in a sandbox module on a host computer. The module collects behaviors of the sample program using dynamic analysis and collects behaviors of the sample program using static analysis. The module feeds the behaviors into a recurrent neural network (RNN) in order to train a model. The model is trained to predict a future behavior of the sample program based upon the behaviors. The network stores the model in persistent storage of the host computer.

In a second embodiment, a method predicts a behavior of a sample program, and the method begins by executing the sample program in a sandbox module on a host computer. The module collects behaviors of the sample program using dynamic analysis and using static analysis. It then feeds the behaviors into a model of a recurrent neural network (RNN) that has been trained to predict behaviors of a computer program. The model predicts a predicted behavior of the sample program based upon the input behaviors. The model then outputs the predicted behavior and takes an action upon the sample program based upon the behavior.

In a third embodiment, a sandbox module on a host computer executes sample programs and includes a dynamic analysis module that collects run-time behaviors of the sample program. A static analysis module collects static behaviors of the sample programs. The behaviors are sent to a recurrent neural network to train one or more models. Each model is trained on a type of sample file. During prediction, the sequence network inputs the behaviors from an unknown sample program. An encoder encodes the behaviors into numerical tuples. A recurrent neural network model inputs the tuples and outputs a predicted behavior of the sample program based upon the tuples. A decoder decodes a numerical tuple representing the predicted behavior and outputs the predicted behavior into a decision engine. The decision engine of the sandbox outputs a decision regarding whether the sample program is malicious or not.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
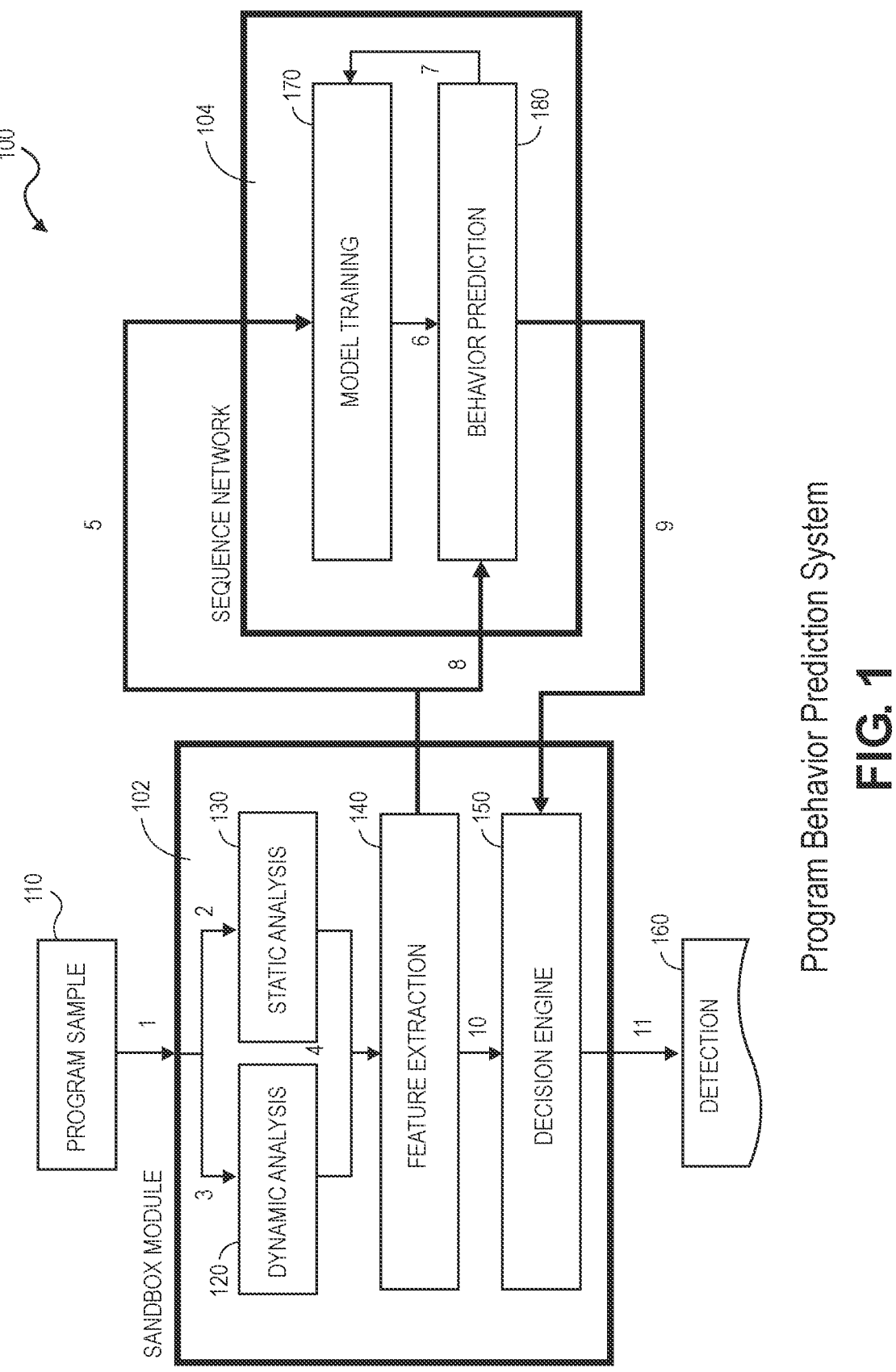
FIG. 1 illustrates the structure and work flow of a program behavior prediction system.

A traditional sandbox creates a controlled environment in which a software program suspected of being malware executes and the sandbox collects run-time behaviors of the program. The sandbox uses these collected behaviors as the basis to detect malware, and the decision as to whether a program is malicious or not depends mainly on those behaviors. Thus, the ability to collect as many significant behaviors as possible is important for malware detection, and is even a criterion to judge whether a sandbox is qualified or not to detect malware. In order to capture these behaviors, a sandbox employs different monitoring techniques. We have reviewed these techniques and have identified their advantages and deficiencies in order to inform and develop this invention.

Software hooking is an old but useful technique. It redirects the control flow in a program under analysis in order to monitor its code by modifying the program code. A sandbox uses hooks to intercept execution flow, such as API calls. Usually the intercepted functions are recorded as program behaviors. Hooking usually imposes very little overhead during execution. As a mature and stable technology, it is widely used in sandbox implementations. Due to its in-system nature, however, software hooks are easy to detect. This means that the "transparency" (the ability to hide itself from malware) of a hook is low. Some low-level hooks have been proposed, such as kernel-mode hooks in the operating system, to be more transparent. Hooks are still easy to be detected by a dedicated attacker though. Moreover, as hooks are a passive way to collect behaviors, they are subject to conditionally-executed code, like the evasions mentioned above. From this point of view, hooks are useful but far from being sufficient.

Because an in-system module such as software hooking will leave detectable traces in a sandbox, and because these traces are not easy to eliminate, hypervisor-based monitoring is also used. This approach monitors execution, but nearly no trace is detectable in a host system because there are few in-system modules. Instead of modifying the memory of a sample program as in software hooking, hypervisor-based monitoring utilizes a CPU's virtualization technology to obtain system control when a special event is triggered. At that moment, it inspects the system memory and tries to find out what the sample is doing. This approach is similar to hooking but has the advantage in that it has higher transparency. Thus, hypervisor-based monitoring is more difficult to detect than hooking, but requires more effort to implement in practice. Generally, it is still a passive method, and is also subject to most evasions, such as logic bombs.

Multi-path exploration or selection is another technique. Pure monitoring is unable to handle some conditionally-triggered code, especially the evasive tricks mentioned above. Even if there are no evasive tricks, the code coverage during sample execution may not be enough; thus, other techniques to reveal this hidden code have been proposed. These techniques are primarily multi-path exploration or selection. These techniques inspect the sample's code and try to execute program paths that have never run before. The difference between exploration and selection lies in the fact that the former tries to execute all of the paths forcefully, but the latter picks one or more potentially important paths for controlled execution. As this is controlled execution, these techniques are an active way (rather than a passive way) of collecting behaviors. These techniques can handle some evasive tricks, but the code analysis introduces plenty of overhead, leading to poor performance. Additionally, they can easily be interfered with by obfuscations in the sample code, which decreases the effectiveness of these techniques.

Increasing the analysis time of a sample program in a sandbox can also help. Some evasive tricks of malware delay execution for a long time, such as sleeping for a long time or sleeping frequently for a short time. In practice, some program samples may simply require more time to execute. Since the analysis time in a sandbox is limited, the sandbox may miss important behaviors. To address that issue, simply increasing the analysis time is one feasible method of improving a sandbox. As for sleep functions used by malware, accelerating the time interval used might also decrease the waiting time. But, this acceleration may also risk affecting the correct execution sequence in certain cases. These techniques are helpful but not always effective. Not to mention the decreased throughput due to longer analysis time, it can be difficult to find a consistent configuration time for all analyzed sample programs.

Generally speaking, these existing techniques all have drawbacks. That is why the behavior-collecting ability of sandboxes has improved so little up until the current day. In consideration of that, we seek out new approaches to enhance sandbox analysis. For example, so-called deep learning technology has been widely used in many areas outside of malware detection. In particular, we realize that a recurrent neural network (RNN) performs well in the fields of time-series analysis, sentiment analysis, speech recognition, even writing books and coding programs (such as the DeepWriting and DeepCoder applications).

We therefore realize that all of the possible behaviors in a program's code, whether they are executed or not during analysis in a sandbox, are similar to a written article. In other words, it is as if each of the behaviors in the code of a program is just like a written sentence in an article, and the elements of each behavior are similar to the words in that sentence. We realize that if a RNN-based model is suitable for analyzing or writing articles, it is also possible to apply that model to the field of computer program behavior predictions.

In fact, other types of machine learning may also be used. Besides an RNN model, the neural network of DBN and GAN models may also be used with the invention. DBN (Deep Belief Networks) is a generative graphical model and can be viewed as a composition of simple networks such as RBMs (Restricted Boltzmann Machines) or auto-encoders. Because of its generative nature, it can also be used within the invention.

We can also implement the sequence network in the form of GAN (Generative Adversarial Network), which is very helpful to build a strong behavior sequence generator or predictor. A GAN is representative of advanced models which combine several networks. It introduces a generator network and a discriminator network. The generator network generates data while the discriminator tries to distinguish the generated data from the real data. The two networks help the training of each other and improve each other. Finally a strong generator and an accurate discriminator are produced.

In the area of traditional machine learning, association rule learning may be used to make predictions for the future behaviors. It is a rule-based machine learning method for discovering interesting relations between variables in large databases. It is intended to identify strong rules discovered in databases using some interesting measures. Many algorithms for generating association rules have been proposed so far, such as FP-growth, A-priori, and so on.

A Markov chain is a stochastic model describing a sequence of possible events in which the probability of each event depends only on the state attained in the previous event. This type of model also fits the scenario of prediction in sequence network as well, and may be used.

While other neural networks, such as MLP and CNN may be used in this invention in theory, they may not be practical or feasible in implementation. MLP (Multi-Layer Perceptron) is a discriminative model that consists of several hidden layers and an output layer. Each layer consists of several artificial neurons. Simple MLPs are not suitable for fitting complex data, but complex MLPs require too much computation resource and are not feasible for practical use. Additionally, due to its discriminative nature, it is less desirable. A CNN (Convolution Neural Network) typically consists of convolutional, pooling and fully-connection layers, and is aimed at handling spatial information such as images. It is also a discriminative model and is best at image processing, which limits its applicability in the present invention.

Practically speaking, a recurrent neural network works well. The behavior of a sample during execution is a temporal sequence, and it can be fit to a language model. The essentials of the temporal analysis or the language model lies in the fact that the temporal information happening early in the sequence may affect the information happening later. An RNN is designed to process this problem, since the temporal information is retained and used to make predictions for further information in the network. Compared to others neural networks, an RNN is more suitable for the long sequence analysis and predicting work.

Program Behavior Prediction System Diagram

FIG. 1 illustrates the structure and work flow of a program behavior prediction system 100. System 100 is designed to implement the method described below on a computer or computers. System 100 includes sandbox module 102 and sequence network 104. The sandbox module collects a set of program behaviors from program sample 110, and feeds them into the sequence network 104. The network performs the predicting job with the data set of the input behaviors. Once a model in the network is trained and ready, predictions for behaviors of unknown program samples may be generated. The sequence network 104 also feeds the predictions back into the sandbox module 102 to make decisions on whether the sample is malicious or not.

Sandbox module 102 employs both a dynamic analysis module 120 and a static analysis module 130. The dynamic analysis module collects the run-time behaviors of program sample 110, mainly via a hooking mechanism, such as by using hooks planted in the user mode and in the kernel mode. The static analysis module 130 performs static analysis on the program sample executable file, with the characteristics of the file structures being retrieved at the beginning of its analysis. Besides that, static analysis also analyzes the control and data flows in the executable file, in order to determine what and in which sequence any API functions are called. In other words, static analysis also accomplishes a portion of collecting behaviors. The dynamic and static analysis modules complement each other. In other words, the static analysis module 130 collects behaviors without running the sample itself while the dynamic analysis module 120 collects the run-time behaviors of the sample. The target of static analysis may be either the program sample file on disk, or may be the image of that program in memory.

Sometimes the dynamic analysis in the sandbox module may fail, without collecting any behaviors. Thus, the system would then depend upon the static analysis to collect significant sequences of behaviors for later predictions. This reliance upon the static analysis only may decrease the confidence of the predicted results. If the static analysis were to fail as well to collect significant behaviors, the prediction would most likely become insignificant. Thus, from the point of making an effective prediction, sufficient and significant behaviors collected in the sandbox module play an important role in the system. Thus, we not only combine dynamic and static analysis, but also implement feature extraction module 140 in order to extract feature behaviors in the sandbox module. Feature extraction is not strictly necessary, but makes it easy to implement model training and behavior prediction in the sequence network 104.

It should be noted that invention would function sufficiently if the static analysis were to fail and only the behaviors from the dynamic analysis are used. In practice, the behaviors from the dynamic analysis have higher confidence than those of the static analysis. In the best case, we have both the dynamic and static analysis results together. And in the worse, we have only the dynamic behaviors or just the static.

The program sample 110 may be in many formats. Besides the commonly seen Windows PE format, various script files may also be program samples and be subject to the analysis. If the sample is not an executable file (such as a file with an extension of ".doc," "pdf," and so on), static analysis will only retrieve the file characteristics. Only the behaviors of form reader programs (such as WinWord and AdobeReader) are recorded during the dynamic analysis.

Even if the sample is not an executable file, the behaviors may be collected from both static analysis and dynamic analysis. Behaviors of any formats that can be executed directly are collected in both dynamic and static analysis, including Windows PE, executable scripts (JavaScript, Python, Powershell, etc.), and so on. If the sample belongs to document types such as Office Documents and PDF files, which cannot be executed directly, the dynamic analysis also will function. Instead of the sample itself, the dynamic analysis collects the behaviors of the reader programs (Office Suites, Adobe Reader, etc.) when they are open. And, for these samples the static analysis only retrieves the file characteristics. Sometimes, a script might be embedded in the document samples. In this situation, the dynamic and static analysis collect the behaviors of the embedded script.

Feature extraction module 140 also plays a role in both sandbox module 102 and in sequence network 104. Feature extraction module 140 summarizes the raw data from both dynamic analysis module 120 and static analysis module 130. Module 140 filters the significant records from the collected behaviors, and then extracts features of these behaviors, such as the function name, necessary arguments and so on. This module 140 may even abstract the raw API calls into a high-level behavior representation, with more operational semantics. Basically, there are at least two kinds of semantic elements for each of the behaviors. One element is the name of behavior, indicating which operation it is, and the other element is the target on which the behavior operates. Sometimes a specific kind of behavior may operate on multiple targets. Once these raw API calls been filtered, extracted, and abstracted with operational semantics, the data is ready for further processing. The data may not only be transferred to sequence network 104 for learning and prediction, but also be sent to decision engine 150 for detection of malware when combined with output from the sequence network. Finally, any detected result from decision engine 150 is output from the sandbox module 102 as a detection 160.

Here a "Decision" means a process to judge if the sample currently analyzed is malicious or not. And, the "detection" here means the judgement report. It contains the judgement on whether the sample is malicious or not. In practice we usually have five judgements, which are "malicious" (may be called high risk in other products), "suspicious" (middle risk), "events found" (low risk), "undecided" (do not know) and "normal." The report also contains the necessary information about the sample execution, including the sandbox environment information (operating system version, software version, etc.), the file characteristics of the sample (file type, created time, etc.), sample behaviors (dynamic and static behaviors, predicted behaviors, etc.) and so on.

Sequence network 104 implements the deep learning portion of the invention. As mentioned above, the extracted features are transferred to network 104 as a data set, which includes the file structure characteristics and refined behaviors which have been collected by modules 120 and 130 as described above. Since the collected behaviors are organized sequentially, we use a recurrent neural networks (RNN) to build a model and train it using model training 170. Considering that the run-time behaviors may vary depending upon the different kinds of file types of the program samples 110 that are input to sandbox module 102, we build multiple RNN models to fit the different file types. Thus, a classifier is used (as will be described below), in order to select the right RNN model for the type of file that produces the extracted feature behaviors that are fed into the sequence network. We feed the classifier with metadata, such as the file structure characteristics, and use its output to choose the proper RNN model.

During the training phase the model learns. The behaviors collected for a particular sample are a sequence of behaviors. Before the training phase, we collect a massive number of sequences of behaviors from many samples, and group them by file types. Based on that we feed the model with the abstracted behaviors with operational semantics in the training phase. For the same file type, we divide all the sequences of behaviors from different samples into two parts, one as the training set, and the other one as the test set. We use the training set to train our model in the sequence network, and the test set to verify and tune the training result of the model. We expect the model during the learning phase will generate the sequences the same as the sequences in the data set.

During this process we do not tell the model if the behavior or the sample is malicious or not (because the aim of the sequence network is to predict the future behaviors, not to make a judgement). It is the decision engine's (150) job to judge if the behavior is malicious or not, no matter how the behavior is collected or predicted. Also we do not tell the model which are the future behaviors. Because in the learning phase, the model needs to generate the sequences of behaviors. In the sequence of learning tasks, the behavior happening later in the sequence is assumed as the future behavior of the former behaviors.

Behavior prediction 180 then uses the trained model to predict a behavior of the program sample, which may be then fed back into model training 170 as well as sent to decision engine 150 to help make a decision regarding whether the program sample 110 is malicious or not.

Architecture of Sequence Network

Figure 2:
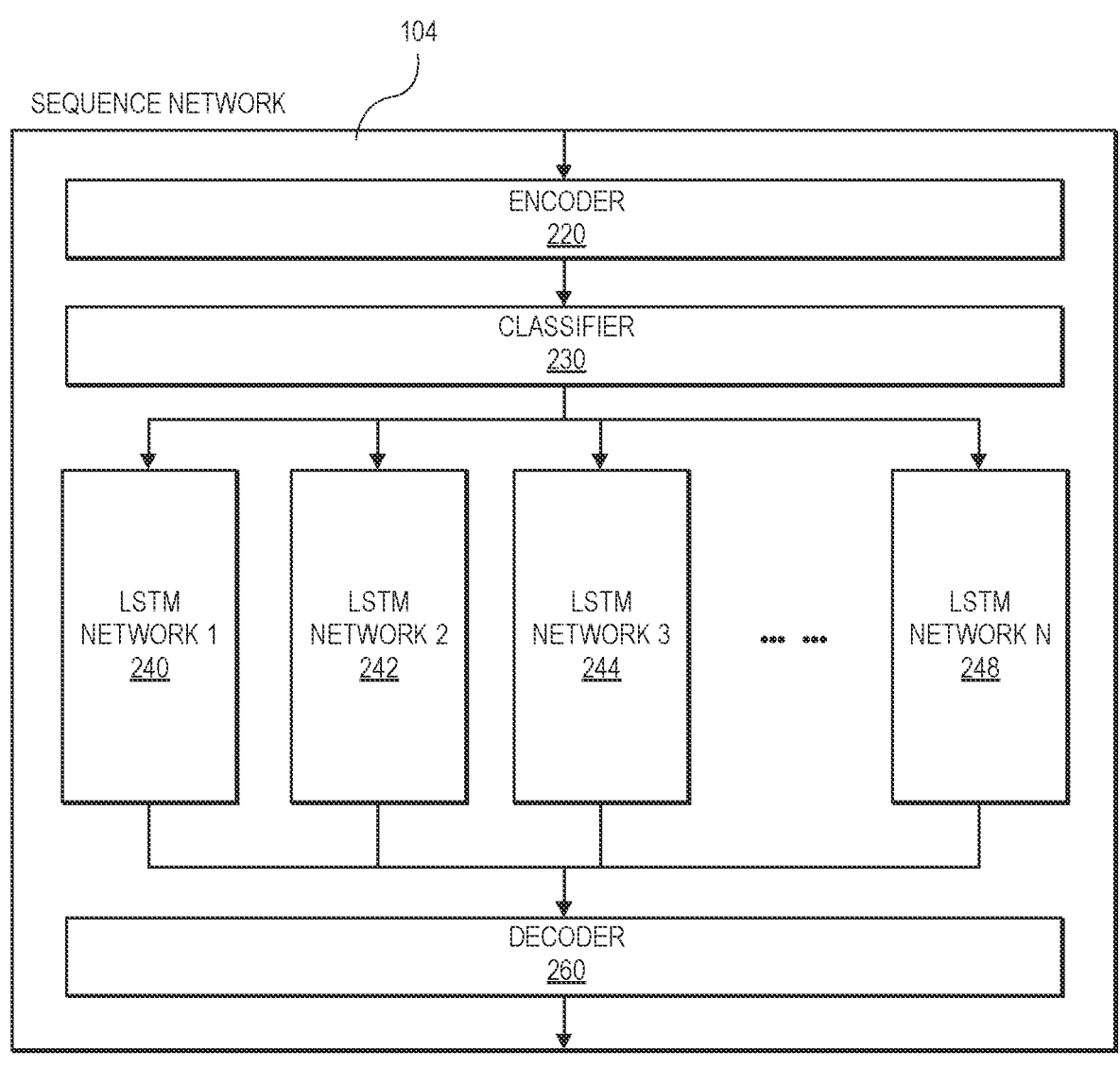
FIG. 2 shows the architecture of sequence network.

FIG. 2 shows the architecture of sequence network 104. This architecture is used in both the model training 170 and behavior prediction 180 described above. Shown is an encoder 220, classifier 230, any number of RNN networks 240-248, and a decoder 260. We implement a classifier 230 at the front end in order to guide the incoming data into the correct model depending upon the type of file that produced the data. Considering the large quantity of behavior data that will be fed to the models as the training source, a large short-term memory (LSTM) network is chosen as the architecture to be used to implement the RNNs. Another network known as the gated-recurrent unit (GRU) may also be used to implement each network 240-248, which may take less training cost, but would have lower accuracy in behavior prediction. In general, it is found that an RNN using the LSTM or GRU architecture may be used, although it is possible to use other neural networks and models such as DBN, GAN, association rule learning, Markov chain model, etc., as explained above.

We may also use another deep learning network, a DBN (deep belief network) or a GAN (Generative Adversarial Network) to address the prediction herein. Besides deep learning and neural networks, some traditional machine learning models may also predict behaviors, such as association rule learning models, represented as FP-growth and A-priori. And, some time-series analysis and mining technologies may also be used. Nevertheless, the deep learning methods, especially RNN, perform better than the other methods in the field of long sequence prediction. In general, deep learning networks work especially well for prediction.

Before processing the data in classifier 230 and in an LSTM network 240-248, the data from the feature extraction module 140 in sandbox module 102 is transformed in an encoder module 220. Generally, text is transformed into a numerical representation. The characteristics are encoded using one-hot vectors to fit the classifier, which may be implemented in various ways, such as a decision tree. Since the number of operations in an operating system is limited, we encode each of the behavior names with a unique identifier. In the form of operational semantics, only the necessary arguments in a behavior are retained. These are typically the targets on which the behaviors operate. Although the quantity of these argument types might be more than that of the behavior names, it is still feasible to give different and limited identifiers to encode them. Meanwhile, we also maintain a lookup table to map the argument types with the specific argument values in a current behavior context, so that we can easily find the specific argument value in a current execution context. It is useful to reconstruct the concrete behavior from the predicted result.

Based on the input behaviors, the result of an LSTM network 240-248 indicates which future behaviors are most likely to happen during execution of the program sample. In implementation, the output of a network is a two-dimensional vector which contains a series of element tuples for the behaviors and their probabilities, indicating what the behavior is and the likelihood that the behavior is going to happen. The tuple contains not only the identifier of the behavior name, but also the identifiers of argument types. We choose the highest value among the probabilities that satisfies a confidence threshold (usually 80%, but may be adjusted higher or lower), together with its behavior element tuple. Then we make a prediction for the next single behavior using the chosen behavior with the highest value. We move on combining the current predicted result with the existing behavior tuples again, as this new data is fed in to the same LSTM network, in order to generate another new output. The predicting process continues until a certain number of predictions are made, or until the predicted probabilities all drop below the confidence threshold.

In the end the sequence network 104 will output the predicted behaviors to engine 150 as clues for decision making in sandbox module 102. Before that, decoder 260 looks up the behavior names with the predicted behavior identifiers, and considering the sequential relationships in execution context, it also retrieves the specific argument values from the table of argument types and values. Thus, the predictions are transformed back into text representations.

Flow Diagram—Learning Phase

As mentioned, the utilization of this method may be divided into two phases, learning (i.e., training a model or models) and application (i.e., predicting behaviors). Each phase will be explained with reference to the numbered steps below and the numbered arrows in FIG. 1.

Figure 3:
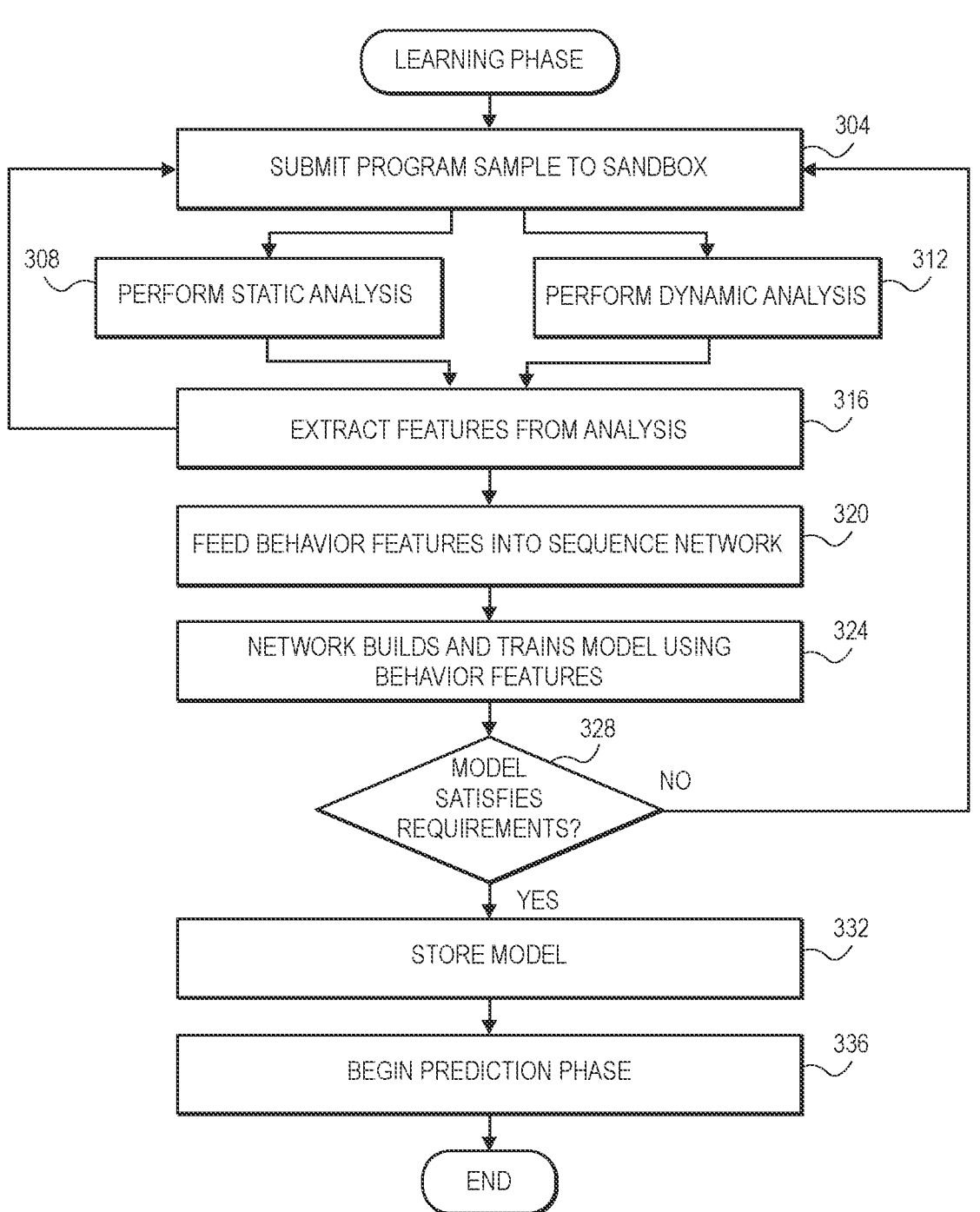
FIG. 3 is a flow diagram describing one embodiment by which a learning phase is conducted.

FIG. 3 is a flow diagram describing one embodiment by which a learning phase is conducted. In step 304 a sample program is submitted (1) into the sandbox module 102. As mentioned earlier, the sample program is of a particular file type which will be determined below. During the learning phase, it is not necessary to tell the sandbox or the sequence network if the sample is malicious or not. The aim of the sequence network is to predict the future behaviors, not to make a judgement. There is no need to know if the sample is malicious or not. For the sandbox, it typically employs a pre-defined method to judge if the sample is malicious or not by itself. The method may use a set of expertise rules or a machine learning model to make the judgement. Thus, the malicious judgement is made by the sandbox itself, usually by the decision engine (150).

In step 308 the sandbox performs (2) static analysis of the sample program. As known in the art, static analysis produces a variety of data such as the file formats, file size, etc. A few examples of the data that static analysis produces include the following. These are the behaviors analyzed without execution, mainly including the metadata for the specific file type, including the file name, type, sha1, md5, size and so on. Besides this, the other information in this output varies by different file types. Generally, if it is an executable file, such as Windows PE and some script files, the behavior sequence via static analysis through the control flow graph and the call group will be retained. Otherwise, only the metadata information will be saved in the output. The static analysis generates outputs like this:

file_name: loader.exe
    sha1: b0127ce307589ef4882658784dd83ef7aa26097b
    md5: fa83ffde24f149fef6d1d8bc05c0e023
    type: WIN32_ExE
    size: 16632464 bytes
    sequence1: [{type: api, name: VirtualAlloc, location: 0x4054164}, {type: api, name: OpenProcess location: 0x405189}]
    sequence2: [{type: instruction, name: CPUID, location: 0x406412}, {type: api, name: strcmp, location: 0x4064F2}]

The behaviors in the sequence may be divided into API calls and instructions, which are the significant operations that may be used for malicious purposes. For API calls, it contains the API name and locations of that. And, the API calls captured here include the process manipulation operations, registry operations, file operations and so on. For instructions, their locations are also produced in this output. The output is in a raw text format, which may also be output as a structured file format, such as XMO, JSON, and so on.

Static analysis also analyzes the file structure characteristics of the sample in order to determine the file type of the sample. The various file types that may be encountered include: Window PE files, various script files (mainly JavaScript, Powerscript, Python, VBS), Office Document files (mainly Word, PPT and XLS), PDF files, Flash SWF files, URL link files, and e-mail message files.

Meanwhile, in parallel, in step 312 the sandbox also performs (3) dynamic analysis of the sample program. As known in the art, dynamic analysis produces a variety of data such as those shown below. These are the behaviors executed during the run time, including the called API functions, some sensitive instructions, and so on. Same as the static analysis, they are the significant operations that may be used to perform malicious purposes. The output is in a raw text format, which may also be output as a structured file format, such as XML, JSON, and so on. The dynamic analysis generates the outputs like this:

20190329031448751 5781 0=LdrLoadDll (3a71a4, 0, c:\windows\system32\fwpuclnt.dll, 738f0000)
    20190329031448761 5781 {INSTRUCTION: CPUID, EAX: 00000001}
    20190329031448761 5781 3a4=socket (23, 2, 0)
    20190329031448761 5781 3a4=socket (2, 1, 6)
    20190329031448761 5781 0=bind (3a4, 0.0.0.0:49501, 16)
    20190329031448761 5781 ffffffff=connect (3a4, asushotfix.com: 443, 16)
    20190329031449763 5781 0=InternalInternetConnectA (cc0, asushotfix.com, 443,,,3, 0, 0)
    20190329031449763 5781 0=InternetOpenUrlA (cc0, https://asushotfix.com/logo.jpg,, 0,-2071985920, 0)

In each of the dynamic behaviors, three elements are contained. The first is the timestamp, indicating what time the behavior is executed. The second is the process identifier of the sample process, which is 5781 in the cases above. If the sample creates multiple processes, multiple process identifiers may occur. The third is the behavior content, showing what operation it is doing at that time. Generally, the content may cover two types of operations, API calls and some sensitive instructions. For API calls, the content covers the return value, API name, and all the arguments for that. And, the API calls captured here include the process manipulation operations, registry operations, file operations and so on. For the sensitive instructions, the dynamic analysis records not only the instruction, but also the related registers, which function as the arguments for that.

In step 316 the sandbox module collects, summarizes and extracts (4) necessary features from the static and dynamic analysis results. More samples are submitted at 304 until enough behavior features are extracted. Examples of raw behaviors and extracted features of behaviors will be explained in greater detail below with reference to FIG. 5.

How many feature behaviors should be extracted and how many samples should be submitted may vary. Greater numbers of features and samples are generally better. However, considering the performance during training and utilizing the models, the numbers should be limited. In practice, we use all the behaviors that are collected in the dynamic and static analysis process. Thus, the number of feature behaviors relies upon the number of behaviors captured. The number is about 150, which includes the API functions and instructions that may be used for malicious, evasive and other sensitive purposes, such as the API of "URLDownloadToFile" for downloading a file from a remote URL to a local file, the instruction of CPUID to retrieve CPU information, and so on. In the sequence network, each model fits a specific file type. We collect behaviors for each of the file types, to train the corresponding model. For each of the file types, at least 10,000 samples should be grouped to collect behaviors.

In step 320, once enough behavior features of a batch of samples are extracted, they are fed (5) into the sequence network 104 as the primary training dataset. When extracted behaviors are submitted for a particular sample, the behaviors are grouped and identified as belonging to a particular sample and a particular file type. The behaviors collected from a particular sample are identified as a sequence of behaviors. And, the sequence of behaviors from different samples, but with the same file type, are grouped together as a batch. Thus, the behaviors are grouped by file type.

In step 324 sequence network 104 builds and trains the models with the fed data of sample program behavior features using model training 170. As mentioned above, the classifier 230 looks at the metadata produced during static analysis to identify which file type is represented by a batch of behavior features belonging to a particular sample that are being input. Behavior features all belonging to one file type are routed to one of the dedicated networks 240-248, while behavior features belonging to another file type are routed to another of the dedicated networks 240-248. Thus, all behaviors coming from samples that are of file type "PE" are routed to network 240 (for example), while all behaviors coming from samples that are of file type "Office Word Document" are routed to network 242 (for example). The result is that each of the models 240-248 will be trained to predict behaviors of a sample of a particular file type (i.e., model 240 is the "PE" model, model 242 is the "Office Word Document" model, etc.). Therefore, during the prediction phase, behaviors from a sample of a particular file type will be routed to the appropriate model.

The building and training of a model (such as a model for a recurrent neural network) using a quantity of source data is known in the art. Nevertheless, the inventors believe that building and training a model using behaviors from sample computer programs is an inventive concept.

In step 328, the sequence network checks whether requirements are met. In order to increase the efficiency of model training, when the model satisfies certain requirements, then in step 332 the model or models are stored within the computer system and then in step 336 the prediction phase may begin (6). Results of the prediction phase with enough confidence (described below) may be fed back (7) into the training process, as another batch of data. If the requirements are not met, then in step 304 more program samples may be submitted.

In step 332 is the model is stored in persistent storage on the computer. It depends on the framework we utilize to implement our model. The model is usually stored as h5 files current days, which is a kind of hierarchical data format.

How a model satisfies the above requirements is as follows. We perform this process iteratively. We divide the dataset fed into the sequence network into a training and a test set. We use the training set to train the model, and the test set to verify and tune the training result, until requirements are satisfied. Firstly, we pick one sequence from the test set, and take only the foremost part of a sequence as the input to the model, to generate the rest of the sequence. We compare the generated part to the picked sequence, to decide how similar they look. The more they look like each other the better. Then we calculate a similarity rate through the comparison. We perform the picking, generation and comparison work for all the sequences in the test set, and finally a set of the similarity rate numbers are acquired. We set a criterion for these numbers. The average of similarity rates should be >=90%, and the minimum value of similarity rates should be >=85% and, if the deviation is low enough, then the requirements are met.

We can also use a GAN, which is another deep learning technology to help the sequence network to meet the requirements. The sequence network is equivalent to the generator in the GAN, and we can setup another network to play the role of discriminator in the GAN. The generator and the discriminator try to compete with each other. Once the generator, which is the sequence network, generates a sequence for which the discriminator cannot tell the difference between a real sequence and a real sample, the requirements are satisfied. The application of GAN here may be regarded as an automation of the iterative process mentioned above.

Thus, in a series of iterations, the learning phase builds a deep learning model or models based upon input behaviors from sample computer programs in order to predict future behaviors of an unknown submitted sample program. Since we apply LSTM networks, the predicted future behaviors are sequences of future program behaviors of the submitted program sample.

Flow Diagram—Prediction Phase

The prediction phase will be explained with reference to the numbered steps below and the numbered arrows in FIG. 1.

Figure 4:
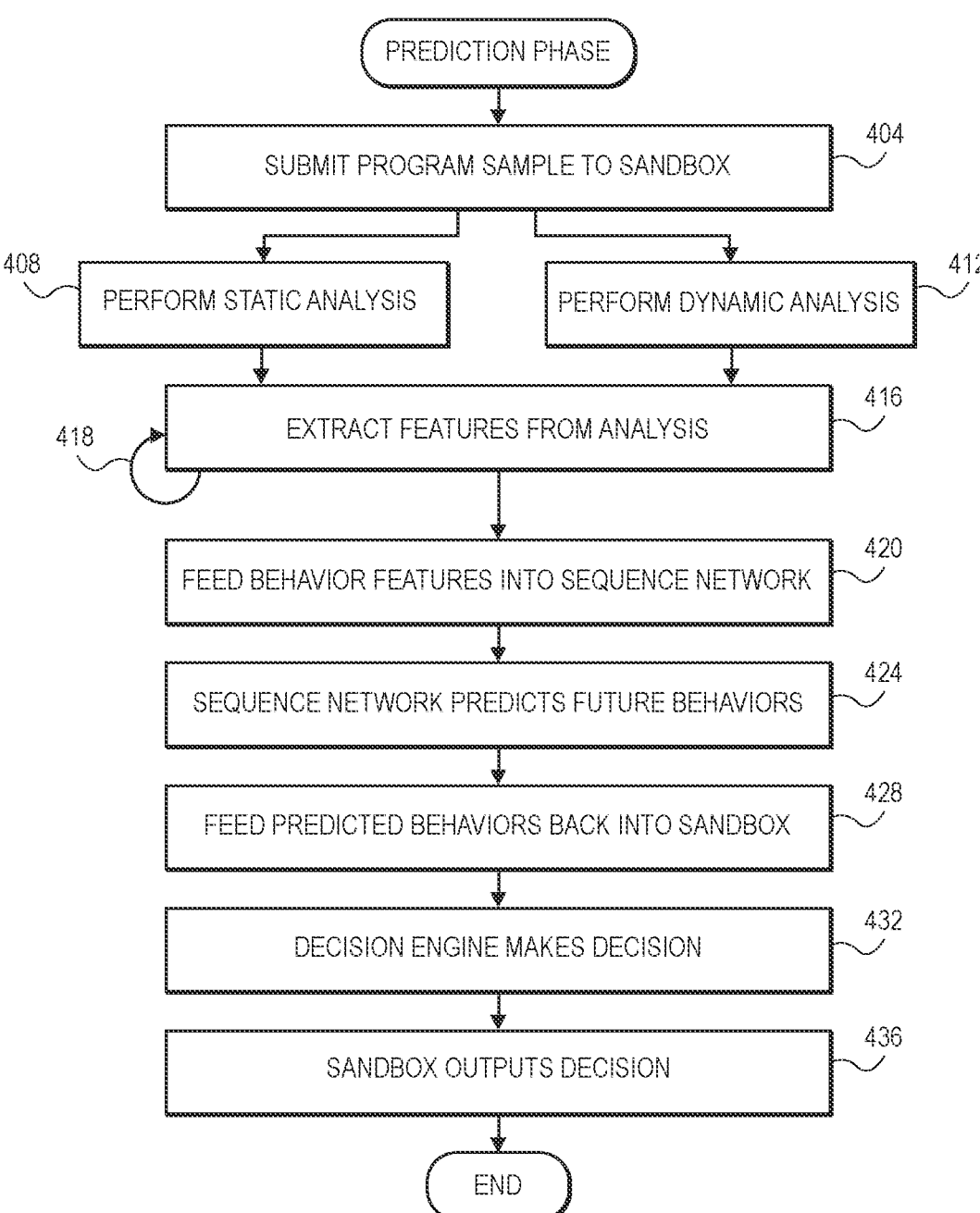
FIG. 4 is a flow diagram describing one embodiment by which a prediction phase is conducted.

FIG. 4 is a flow diagram describing one embodiment by which a prediction phase is conducted. In step 404 a sample is submitted (1) into the sandbox module 102. Examples of types of samples are provided above. It is unknown whether this sample program is malicious or not; the sequence network will predict future behaviors of the sample and those results will be used to inform the decision engine 150 when it makes a decision about whether the sample is malicious or not.

In step 408 the sandbox performs (2) static analysis of the sample program. As known in the art, static analysis produces a variety of data such as those described above. Meanwhile, in parallel, in step 412 the sandbox also performs (3) dynamic analysis of the sample program. As known in the art, dynamic analysis produces a variety of data such as those described above.

In step 416 the sandbox module collects, summarizes and extracts (4) necessary features from the static and dynamic analysis results. Behavior features continue to be extracted from the sample at 418 until enough behavior features are extracted. Examples of raw behaviors and extracted features of behaviors will be explained in greater detail below with reference to FIG. 5.

We know when enough behavior features are extracted from the sample depending upon the future predictions. That is, it depends on how long in the future one wants the model to predict. For example, a sample executed in a sandbox for 60 seconds will generates a sequence with 1,000 behaviors. If we want to make the prediction for a period of 60 seconds, we assume 1,000 behaviors is enough. In practice, we expect to predict as far as possible in the future, so we run a lot of samples in the sandbox for 10 minutes and collect their sequences of behaviors. Based on the length of each sequence, we get the average value of all the lengths as the threshold number for enough behaviors.

In step 420, once enough behavior features of a sample are extracted, they are fed (8) into the sequence network 104 for a prediction. As mentioned above, the classifier 230 looks at the metadata produced during static analysis to identify the file type of the particular sample that is input. Based upon that file type, the extracted behaviors will be routed to the appropriate model that has been trained in the earlier phase to predict behaviors from a sample of that file type.

In step 424 the sequence network predicts future behavior of the program sample based upon the input extracted behaviors. Outputting a value using a series of input values (such as by using a model from a recurrent neural network) is known in the art. Nevertheless, the inventors believe that predicting a future behavior of a sample computer program based upon input behaviors of that sample program using a recurrent neural network is an inventive concept.

In step 428 the predicted future behaviors are fed back (9) into the sandbox, as the behaviors that are predicted to be executed in the future by the program sample. In step 432 the decision engine 150 combines the collected behavior features from step 416 in the sandbox with the predicted behaviors from the sequence network, in order to make a final decision. In step 436 the sandbox outputs (11) the final decision for the submitted sample program as a detection result 160.

In one embodiment, in the prediction phase above, the learning phase may be disabled, and only available in an offline mode. In an additional embodiment, it is possible to combine the two phases, such as by enabling the flows at (5) and (8) at the same time. In this additional embodiment, the predicted future behaviors from step 424 not only are used as a source to make a decision in step 432, but also are used (7) as new data to train the model. In this additional embodiment, the system updates and trains the model on the fly, in an online mode. No matter which mode is adapted for training the model (online or offline), an initial well-trained model is important. And, because it is desirable to make the prediction phase accurate from the beginning, it is preferable to launch the learning phase in an offline mode first in order to train the initial model from the outset. Nevertheless, combining both phases and executing the learning phase in an online mode is possible.

Prediction Phase Example

Figure 5:
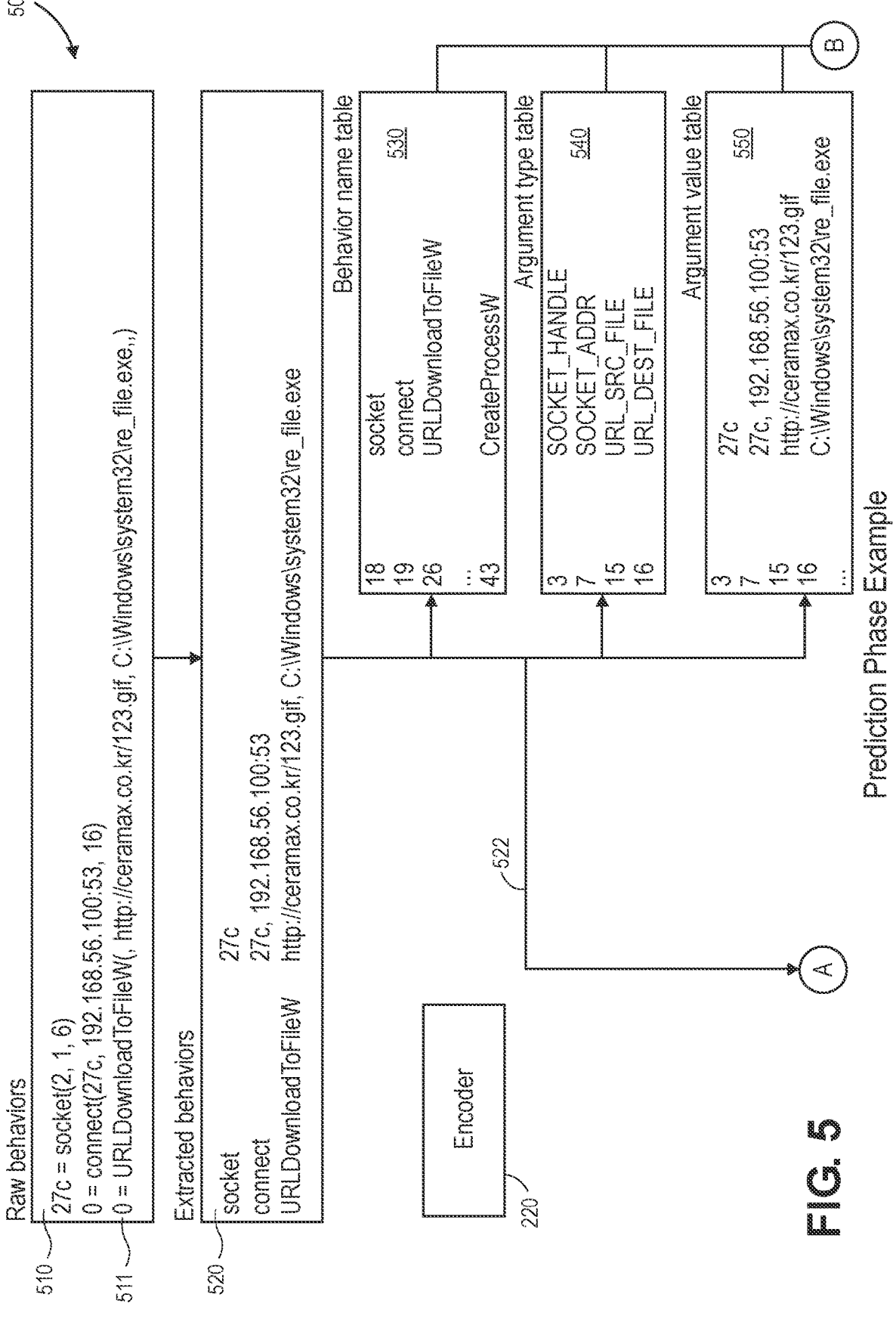
FIG. 5 is an example showing how the prediction phase works in detail.
Figure 5:
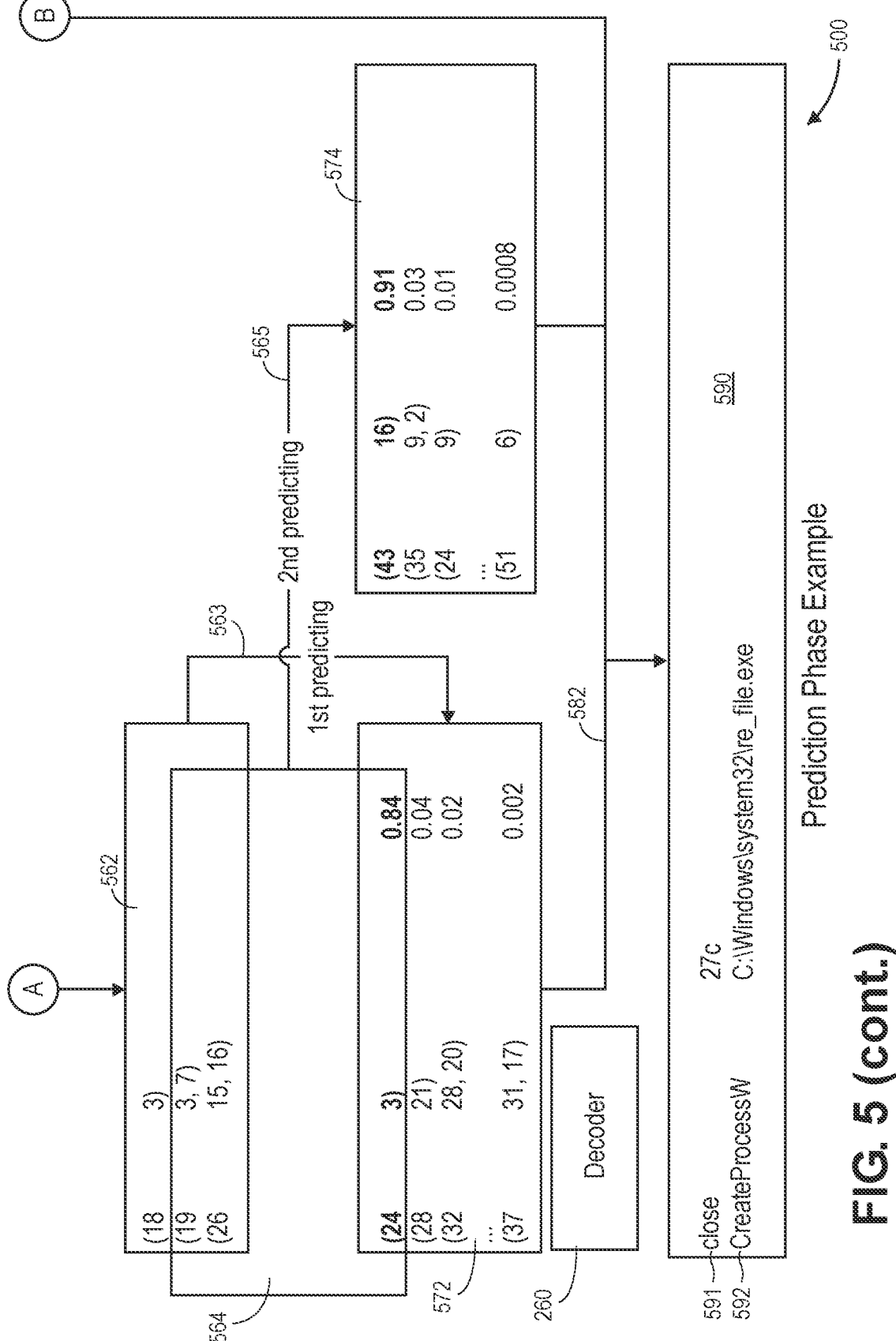

FIG. 5 is an example 500 showing how the prediction phase works in detail. In this example, the sample is a Windows PE type file, and thus we use classifier 230 in order to select the proper model (i.e., one of models 240-248) for that file type. In this example, we know that the sample performs network downloading behaviors during the sandbox analysis. Unfortunately, the complete behavior chain is lost because the dynamic analysis timed out. Behaviors that might have been captured during dynamic analysis are lost because the analysis ends. Even the image of the sample is obfuscated by malware tricks, meaning that static analysis is not able to retrieve additional behaviors. Although we have only the socket establishment and downloading raw behaviors shown at 510, it will be advantageous to use sequence network 104 in order to predict future behaviors of the sample in order to make a decision about whether it is a threat or not. These predicted future behaviors are not available from either the static analysis or the dynamic analysis.

As mentioned, dynamic analysis 120 in sandbox module 104 has produced raw behaviors 510 (such as API calls) and these in are fed into feature extraction 140 in order to extract them into behaviors with semantic elements, shown at 520. These extracted behaviors are then encoded in numerical representations using encoder 220 in sequence network 104. The output of the encoder is shown at 522 which produces encoded behaviors 562 and tables 530, 540 and 550. For example, the raw behavior "27c=socket (2, 1, 6)" is basically the opening of a socket having a socket handle of "27c." Feature extraction 140 produces an extracted behavior 520 (more suitable for encoding) "socket 27c", which represents the important features of that behavior, namely opening a socket and the socket handle. This extracted behavior "socket 27c" is then encoded as "(18 3)."

Besides table 530 which maps a numeric value to a behavior name (i.e., "18" represents the behavior of opening a socket), and table 540 which maps a numeric value to an argument type (i.e., "3" represents a socket handle), a lookup table 550 is also built to map each argument type numeric value to a recent behavior (i.e., the argument type of "3" is mapped to the specific recent socket handle "27c". The lookup table 550 will be used below to re-create a textual representation of the predicted behaviors for output to the decision engine 150.

These three encoded behaviors 562 (representing the original three raw behaviors 510) are then fed into the appropriate model for processing, i.e., steps 420-424 are performed. Based upon these three encoded behaviors 562 the model then predicts future behaviors in a first round of predicting 563 and outputs first predicted results shown at 572.

As shown at 572, the predicted result during each round is a two-dimensional vector, indicating the possible future behaviors of the sample, i.e., behaviors that would follow the behavior 511, along with a confidence value for each behavior, ordered by confidence value. The most likely behavior in the first round is the behavior "(24 3) 0.84", meaning that a behavior having an identifier of "24" and an argument type having an identifier of "3" in a tuple with an 84% probability of occurring.

Since the value of "0.84" is above a confidence threshold (in this example the confidence threshold is 80%) we assume that behavior "(24 3) 0.84" will occur after behavior "(26 15,16) and thus we can make a second prediction round 565 using the predicted behavior "(24 3) 0.84" along with two of the behaviors from behaviors 562.

In this example in the second round only two of the original behaviors are used and the behavior "(18 3)" is not used. We can, in theory, use all past behaviors to make a prediction; however, in this example, we consider only a fixed number of past behaviors in the sequence. In FIG. 5, the fixed number is set to "3." That is why only two of the original behaviors are used. It is similar to a sliding window that contains the fixed number of behaviors moving forward as future predictions are made. In theory, the past behaviors considered in order to make prediction may contain all the behaviors of the past. Although not so practical, the number need not be fixed as a constant.

Accordingly, the predicted behavior "(24 3) 0.84" is combined with the existing encoded behaviors (or a most recent subset of those behaviors) to form a new set of encoded behaviors 564. This new set 564 is then fed again into the appropriate model for the second prediction round 565, i.e., steps 420-424 are performed again. The model then predicts future behaviors in the second round of predicting and outputs second predicted results shown at 574.

The most likely behavior in this second round is the behavior "(43 16) 0.91", meaning that a behavior having an identifier of "43" and an argument type having an identifier of "16" in a tuple with a 91% probability of occurring. In this example, behavior "43" is a process creation identifier.

In this example, we only perform two rounds of predictions to obtain the next two behaviors. As shown, there are only two rounds in this example. There may be three or four or more rounds in practice. The number of rounds to perform may depend upon a set of stop conditions. In one embodiment, we have a maximum threshold for the number of rounds; when the number is reached, the prediction stops. Or, in each of the rounds, at least one item in the predicted results should satisfy the confidence threshold. If not, we regard the predictions as not believable any longer, thus the prediction rounds are stopped.

Next, the decoder 582 reconstructs all of the selected predictions and creates text representations using tables 530, 540 and 550. As shown, behaviors "24" and "43" are now listed as a behavior 591 of closing a previously opened socket (i.e., identifier "24" represents closing in a socket) and a behavior 592 of executing the downloaded file C:\Windows\system32\re_file.exe in the computer system (i.e., identifier "43" represents creating a process).

As mentioned above, these behaviors 590 may then be fed (9) from the sequence network back into the sandbox module. The decision engine 150 then considers the previously collected behaviors (from the static and dynamic analysis) and the predicted behaviors together, so that a decision can be made based upon the rules that decision engine 150 uses. For example, in this case, the engine will use the behavior rule "sample executes dropped file from URL." The engine will output a decision of "sample is suspicious" and in step 436 this output will be sent to detection module 160 for action to be taken.

Other rules include: Rule Enumerate_Process (which contains the behavior sequence of CreateToolhelp32Snapshot, Process32First and Process32Next, with the same as argument); Rule Print_Screen (which contains the behavior sequence of CreateCompatibleDC, CreateCompatibleBitmap, SelectObject and BitBlt, with related arguments in the sequence chain); Rule Inject_Remote_Process (which contains the behavior sequence of OpenProcess, VirtualAlloc, WriteProcessMemory and CreateRemoteThread, with related arguments in the sequence chain); and Rule Lookup_Privileges, which contains the behavior sequence of OpenProcessToken, and LookupPrivilege ValueA/LookupPrivilegeValueW, with the same process handle as argument in the sequence chain.

Detection module 160 may simply be implemented as a judgement report, which is the main output of the prediction system 100. With this report, we further process the input jobs. If a sample is reported to be malicious (or even suspicious), we can provide warnings and block the sample in our network environment. With the detailed behaviors provided in the report, we can investigate and determine what exactly the sample is doing during execution.

Computer System Embodiment

Figures 6A, 6B:
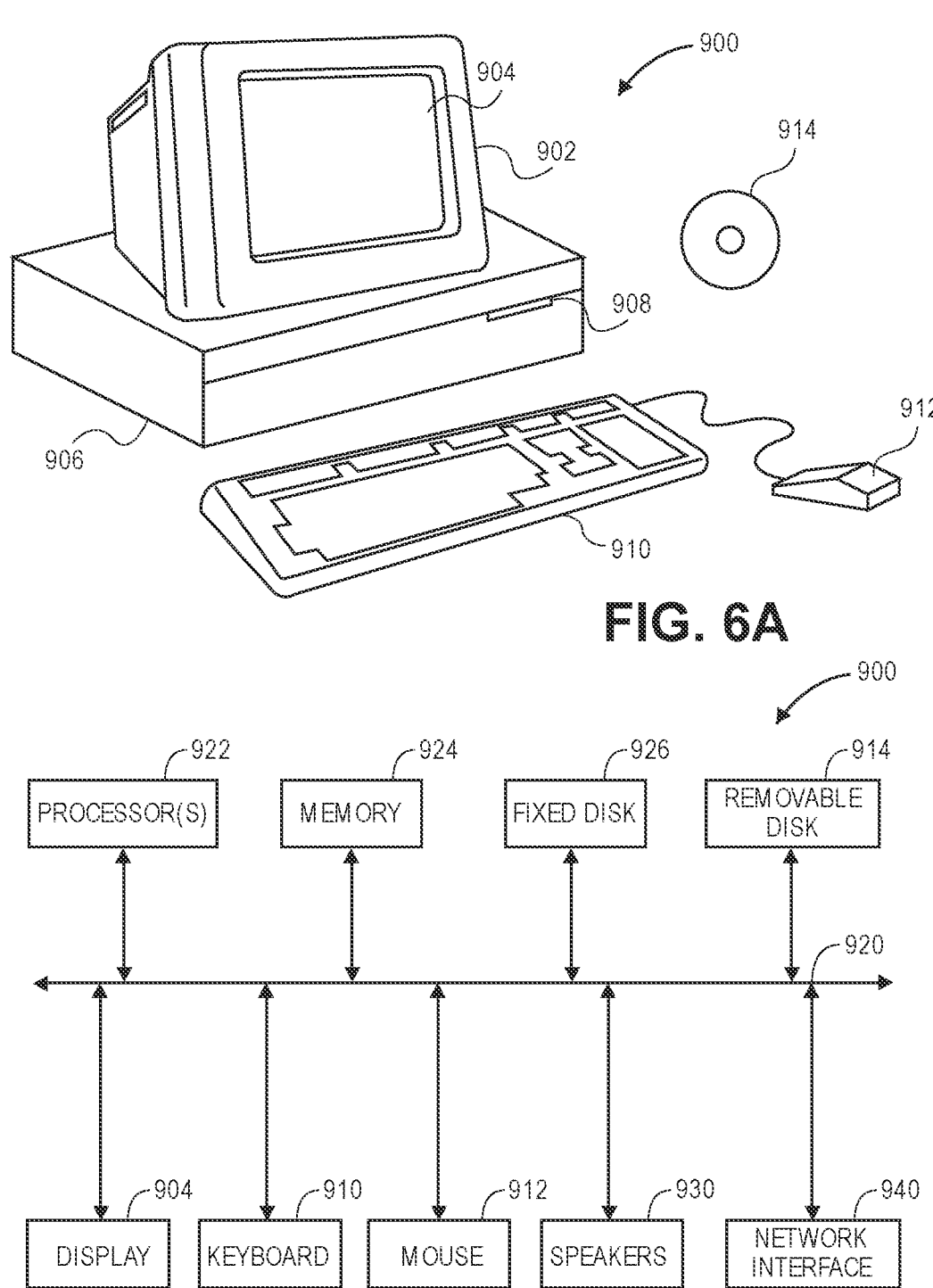
FIGS. 6A and 6B illustrate a computer system suitable for implementing embodiments of the present invention.

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of predicting a behavior of a sample program, said method comprising:

executing said sample program in a sandbox module on a host computer;

collecting first behaviors of said sample program using dynamic analysis;

feeding said first behaviors into a model of a recurrent neural network that has been trained to predict behaviors of a computer program;

predicting, by said model, a first predicted behavior of said sample program based upon said first behaviors, wherein said predicting occurs after said collecting and wherein said first predicted behavior is a future behavior at the time of said predicting and is not available from said dynamic analysis;

outputting said first predicted behavior and taking an action upon said sample program based upon said first predicted behavior.

2. A method as recited in claim 1 wherein said taking an action includes outputting a result that said sample program is malicious software.

3. A method as recited in claim 1 further comprising:

feeding said first behaviors into a classifier before said feeding into said model in order to select said model of said recurrent neural network based upon a file type of said sample program.

4. A method as recited in claim 1 further comprising:

outputting said first predicted behavior to a decision engine of said host computer that performs said taking an action based upon a rule of said decision engine.

5. A method as recited in claim 1 wherein said first predicted behavior is a numerical tuple, said method further comprising:

encoding said first behaviors;

feeding said encoded first behaviors into said model;

decoding said first predicted behavior to produce a textual representation of said predicted behavior.

6. A method as recited in claim 5 further comprising:

decoding said predicted behavior using a table that maps numerical identifiers of listed behaviors to textual representations of said listed behaviors.

7. A method as recited in claim 1 further comprising:

predicting, by said model, a second predicted behavior of said sample program based upon a subset of said first behaviors and said first predicted behavior; and outputting said first and second predicted behaviors and taking an action upon said sample program based upon said first and second predicted behaviors.

8. A method of predicting a behavior of a sample program, said method comprising:

executing said sample program in a sandbox module on a host computer;

collecting first behaviors of said sample program using dynamic analysis;

collecting second behaviors of said sample program using static analysis;

feeding said first and second behaviors into a model of a recurrent neural network (RNN) that has been trained to predict behaviors of a computer program; and predicting, by said model, a first predicted behavior of said sample program based upon said first and second behaviors, wherein said predicting occurs after said steps of collecting and wherein said first predicted behavior is a future behavior at the time of said predicting and is not available from said dynamic analysis; and outputting said first predicted behavior and taking an action upon said sample program based upon said first predicted behavior.

9. A method as recited in claim 8 wherein said taking an action includes outputting a result that said sample program is malicious software.

10. A method as recited in claim 8 further comprising:

feeding said first and second behaviors into a classifier before said feeding into said model in order to select said model of said recurrent neural network based upon a file type of said sample program.

11. A method as recited in claim 8 wherein said first predicted behavior is not one of said first or second behaviors.

12. A method as recited in claim 8 further comprising:

outputting said first predicted behavior to a decision engine of said host computer that performs said taking an action based upon a rule of said decision engine.

13. A method as recited in claim 8 wherein said first predicted behavior is a numerical tuple, said method further comprising:

decoding said first predicted behavior to produce a textual representation of said first predicted behavior.

14. A method as recited in claim 13 further comprising:

decoding said first predicted behavior using a table that maps numerical identifiers of listed behaviors to textual representations of said listed behaviors.

15. A method as recited in claim 8 further comprising:

predicting, by said model, a second predicted behavior of said sample program based upon a subset of said first and second behaviors and said first predicted behavior; and outputting said first and second predicted behaviors and taking an action upon said sample program based upon said first and second predicted behaviors.

16. A method as recited in claim 8 further comprising:

inputting said first predicted behavior into said model of said recurrent neural network in order to train said model.

17. A program behavior prediction system comprising:

a sandbox module executing upon a host computer arranged to execute a sample program, said sandbox module including a dynamic analysis module arranged to collect run-time behaviors of said sample program, a decision engine arranged to output a decision regarding said sample program based upon an output first predicted behavior from a machine learning network model; and a sequence network executing upon said host computer arranged to input said run-time behaviors from said sample program, said sequence network including an encoder arranged to encode said run-time behaviors into numerical tuples, said machine learning network model that inputs said numerical tuples and is trained to output said first predicted behavior of said sample program based upon said numerical tuples, wherein said first predicted behavior is a future behavior at the time of said output from said machine learning network model and is not available from said dynamic analysis module, and a decoder arranged to decode a numerical tuple representing said predicted behavior into an output predicted behavior for delivery to said decision engine.

18. A system as recited in claim 17 wherein said network further includes a plurality of machine learning network models, and a classifier that classifies said sample program as being of a particular file type, wherein said classifier routes said run-time behaviors to one of said models based upon said file type of said sample program.

19. A system as recited in claim 17 wherein said model predicts a second predicted behavior of said sample program based upon a subset of said first behaviors and said first predicted behavior, and wherein said model outputs said first and second predicted behaviors and takes an action upon said sample program based upon said first and second predicted behaviors.

20. A method as recited in claim 5 further comprising:

feeding said textual representation of said first predicted behavior into a decision engine; and said decision engine performing an action based upon said collected behaviors and said textual representation of said first predicted behavior.

\* \* \* \* \*